United States Patent
Wang

(10) Patent No.: US 11,138,701 B2
(45) Date of Patent: Oct. 5, 2021

(54) IMAGE PROCESSING METHOD, STORAGE MEDIUM, AND ELECTRONIC APPARATUS

(71) Applicant: Guangdong OPPO Mobile Telecommunications Corp., Ltd., Guangdong (CN)

(72) Inventor: Huichao Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/544,291

(22) Filed: Aug. 19, 2019

(65) Prior Publication Data
US 2020/0058111 A1 Feb. 20, 2020

(30) Foreign Application Priority Data
Aug. 20, 2018 (CN) .......................... 201810950224.7

(51) Int. Cl.
*G06T 5/00* (2006.01)
*G06T 7/11* (2017.01)
(Continued)

(52) U.S. Cl.
CPC .......... *G06T 5/009* (2013.01); *G06K 9/00624* (2013.01); *G06T 5/20* (2013.01);
(Continued)

(58) Field of Classification Search
CPC . G06T 5/009; G06T 7/13; G06T 2207/20192; H04N 1/6005
See application file for complete search history.

(56) References Cited

U.S. PATENT DOCUMENTS

2006/0082677 A1   4/2006  Donomae et al.
2014/0133778 A1*  5/2014  Sasaki ................. G06T 5/004
                                                          382/274
(Continued)

FOREIGN PATENT DOCUMENTS

CN          1354950 A          6/2002
CN          1898945 A          1/2007
(Continued)

OTHER PUBLICATIONS

Shi-Kuo Chang, Yin-Wah Wong,Optimal Histogram Matching by Monotone Gray Level Transformation, Communications of the ACM,Association for Computing Machinery,Inc,United States,Oct. 1, 1978,pp. 835-840,vol. 21,No. 10.
(Continued)

*Primary Examiner* — Christopher K Peterson
(74) *Attorney, Agent, or Firm* — Young Basile Hanlon & MacFarlane, P.C.

(57) ABSTRACT

An image processing method includes acquiring an image in a chrominance-luminance separation color mode; performing scene recognition of the image to determine a scene of the image; traversing luminance components of respective pixel points in the image, and generating a luminance distribution of the image according to a traversing result of the luminance components; generating a luminance mapping relation based on a standard luminance distribution corresponding to the scene of the image and the luminance distribution of the image; and adjusting the luminance components of the respective pixel points in the image according to the luminance mapping relation to generate a first processed image.

5 Claims, 9 Drawing Sheets

(51) Int. Cl.

| | | |
|---|---|---|
| *G06T 7/13* | (2017.01) | |
| *G06K 9/00* | (2006.01) | |
| *G06T 5/20* | (2006.01) | |
| *G06T 5/50* | (2006.01) | |
| *H04N 5/235* | (2006.01) | |
| *H04N 9/67* | (2006.01) | |
| *H04N 9/78* | (2006.01) | |
| *H04N 1/60* | (2006.01) | |
| *G06T 7/90* | (2017.01) | |

(52) U.S. Cl.
CPC ............... *G06T 5/50* (2013.01); *G06T 7/11* (2017.01); *G06T 7/13* (2017.01); *H04N 5/2351* (2013.01); *H04N 9/67* (2013.01); *H04N 9/78* (2013.01); *G06T 2207/10024* (2013.01); *G06T 2207/20192* (2013.01); *G06T 2207/20221* (2013.01)

(56) References Cited

U.S. PATENT DOCUMENTS

| | | | |
|---|---|---|---|
| 2016/0307602 A1 | 10/2016 | Mertens | |
| 2017/0139572 A1* | 5/2017 | Sunkavalli | .......... G06F 3/04842 |
| 2020/0058110 A1* | 2/2020 | Wang | .......... G06T 5/40 |
| 2020/0058112 A1* | 2/2020 | Wang | .......... G06T 7/13 |

FOREIGN PATENT DOCUMENTS

| | | |
|---|---|---|
| CN | 102214357 A | 10/2011 |
| CN | 102231264 A | 11/2011 |
| CN | 103079038 A | 5/2013 |
| CN | 103345726 A | 10/2013 |
| CN | 104580925 A | 4/2015 |
| CN | 107068042 A | 8/2017 |
| CN | 108900819 A | 11/2018 |
| CN | 109272459 A | 1/2019 |
| CN | 109727215 A | 5/2019 |
| EP | 3243322 B1 | 7/2018 |

OTHER PUBLICATIONS

Chao Wang,Zhongfu Ye,Brightness Preserving Histogram Equalization with Maximum Entropy:A Variational Perspective,IEEE Transactions on Consumer Electronics,Nov. 1, 2005,pp. 1326-1334,vol. 51,No. 4.
Fundamentals of Digital Image Processing,Fundamentals of Digital Image Processing,Prentice-Hall International,Jan. 1, 1989,pp. 233-244,US.
International Search Report for Application No. PCT/CN2019/101600 dated Nov 18, 2019.(4 pages).
European Search Report for Application No. EP19192425 dated Jan 8, 2020.(11 pages).
Chinese First Office Action and Written Opinion for related Chinese application NO.201810950224.7, dated Mar. 12, 2020 (11 pages).
Indian First Examination Report for Indian Application No. 201914033356 dated Dec. 28, 2020 (6 pages).

* cited by examiner

IMAGE PROCESSING METHOD, STORAGE MEDIUM, AND ELECTRONIC APPARATUS

CROSS-REFERENCE TO RELATED APPLICATION(S)

This application claims priority to Chinese Patent Application No. 201810950224.7, filed on Aug. 20, 2018, the contents of which are herein incorporated by reference in their entireties.

TECHNICAL FIELD

Embodiments of the present disclosure relate to the technical field of image processing, particularly to an image processing method, a storage medium, and an electronic apparatus.

BACKGROUND

With rapid development of electronic apparatuses, the electronic apparatuses, such as mobile phones and tablet computers, all have image capturing functions, and users have increasingly high requirements for quality of images captured by the electronic apparatuses.

At present, after an image is captured, the image is generally brightened, so that a relatively dark region in the obtained image could become brighter and details hardly distinguished with naked eyes could be displayed, thereby improving definition of the entire image. However, in the above image brightening manner, RGB values of each pixel point in the image are generally enhanced, which will lead to the following problems: color in the image is unduly enhanced to be close to gray, and color of the brighter region, after being enhanced, undergoes distortion to become blurred. Image distortion causes loss of details in the distorted region, and generally, the distorted region of the image may be the user's region of interest, for example, a human face region in the image.

SUMMARY

The image processing method and device, storage medium and electronic apparatus provided by the embodiments of the present disclosure realize improving image luminance on the basis of no distortion of the image color.

In a first aspect, an embodiment of the present disclosure provides an image processing method, the method may include: traversing luminance components of respective pixel points in an image, and generating a luminance distribution of the image according to a traversing result of the luminance components; generating a luminance mapping relation based on a standard luminance distribution corresponding to a scene of the image and the luminance distribution of the image; and adjusting the luminance components of the respective pixel points in the image according to the luminance mapping relation to generate a first processed image.

In a second aspect, an embodiment of the present disclosure provides an image processing device, including: an image acquisition module configured to acquire an image in a chrominance-luminance separation color mode; a scene recognition module configured to perform scene recognition of the image to determine a scene of the image; a luminance distribution generation module configured to traverse luminance components of respective pixel points in the image and to generate a luminance distribution of the image according to a traversing result of the luminance components; a luminance mapping relation generation module configured to generate a luminance mapping relation based on a standard luminance distribution corresponding to the scene of the image and the luminance distribution of the image and a first processed image generation module configured to adjust the luminance components of the respective pixel points in the image according to the luminance mapping relation to generate a first processed image.

In a third aspect, an embodiment of the present disclosure provides a non-transitory computer-readable storage medium having a computer program stored thereon, when the computer program is executed by a processor, an image processing method may be implemented. The method may include: traversing luminance components of respective pixel points in an image, and generating a luminance distribution of the image according to a traversing result of the luminance components; comparing a pixel point ratio of each luminance component in the luminance distribution of the image with a pixel ratio of a corresponding luminance component in a standard luminance distribution; generating a luminance mapping relation based on a standard luminance distribution corresponding to a scene of the image and the luminance distribution of the image; and when pixel point ratio of one luminance component in the luminance distribution of the image is less than a pixel point ratio of a corresponding luminance component in the standard luminance distribution, mapping at least one of subsequent luminance components into the one luminance component until the pixel point ratio of the one luminance component in the luminance distribution of the image equals to the pixel point ratio of the corresponding luminance component in the standard luminance distribution.

In a fourth aspect, an embodiment of the present disclosure provides an electronic apparatus, including: a camera configured to acquire an image in a chrominance-luminance separation color mode, a memory, a processor, and a computer program stored on the memory and operable by the processor, where the processor, when executing the computer program, may implement an image processing method including: performing scene recognition of an image to determine a scene of the image; generating a luminance mapping relation based on a standard luminance distribution corresponding to a scene of the image and the luminance distribution of the image; and adjusting the luminance components of the respective pixel points in the image according to the luminance mapping relation to generate a first processed image, such that luminance distribution of the image is the same as the standard luminance distribution.

The image processing method provided in the embodiment of the present disclosure adaptively selects standard luminance distribution corresponding to a scene through the scene of the image, generates a luminance mapping relation according to the standard luminance distribution corresponding to the scene of the image and luminance distribution of the image, adjusts luminance components of respective pixel points in the image according to the luminance mapping relation to generate a first processed image, thereby making it possible to achieve an optimal effect for images of different scenes and improving applicability of the image processing manner. Meanwhile, since the method processes independent luminance components, without involving any adjustment of color components, it is guaranteed that the image color remains as it is in the above image processing process, without affecting or changing the color, and the guaranteed image color is clear without distortion.

DETAILED DESCRIPTION

Figure 1A:
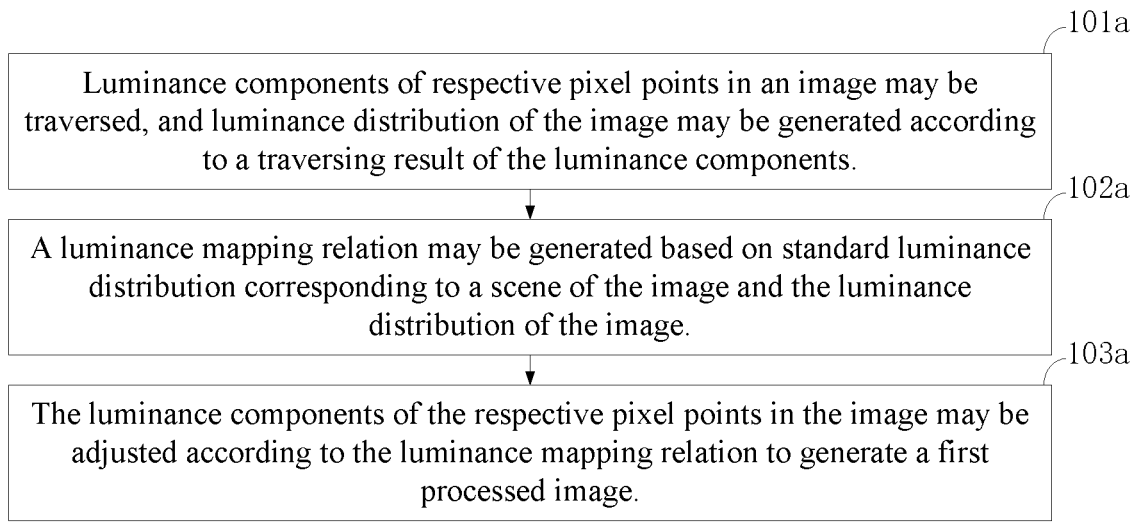
FIG. 1A is a flow chart diagram of an image processing method according to an embodiment of the present disclosure.

Technical solutions of the present disclosure will be further described below in conjunction with the accompanying drawings through specific embodiments. It could be understood that, the specific embodiments described herein are used merely to interpret the present disclosure instead of limiting the present disclosure. In addition, it should be further noted that, for the convenience of description, only some but not all of the structures related to the present disclosure are shown in the drawings.

Before discussing exemplary embodiments in more detail, it should be noted that some exemplary embodiments are described as a process or method depicted as a flowchart. Although the flowchart describes various steps as sequential processing, many of the steps can be implemented in parallel, concurrently, or simultaneously. In addition, the sequence of the steps can be rearranged. The processing may be terminated when the operations are completed, but additional steps not included in the drawings may also be included. The processing may correspond to methods, functions, procedures, subroutines, subprograms and the like.

FIG. 1A is a flow chart diagram of an image processing method according to an embodiment of the present disclosure. The method can be performed by an image processing device. The device can be implemented by software and/or hardware and can be generally integrated into an electronic apparatus. The method can include actions or operations at blocks illustrated in FIG. 1A.

Block 101a: Luminance components of respective pixel points in an image may be traversed, and luminance distribution of the image may be generated according to a traversing result of the luminance components.

Exemplarily, the electronic apparatus in the embodiment of the present disclosure may include an intelligent apparatus equipped with an image capturing device, for example, a mobile phone, a tablet computer, or the like.

Color is usually described by three relatively independent attributes. Three independent variables act together to naturally form a spatial coordinate, which is a color mode. The color mode can be divided into a primary color mode and a chrominance-luminance separation color mode. For example, the primary color mode includes, but is not limited to, a RGB color mode, and the chrominance-luminance separation color mode includes, but is not limited to, a YUV color mode and a Lab color mode. In the YUV color mode, the Y component represents luminance; the U component represents chrominance; and the V component represents concentration, where the U component and the V component together represent color of the image. In the Lab color mode, the L component represents luminance, and the a and b together represent color. In an image in the chrominance-luminance separation color mode, the luminance component and the color component may be separately extracted, such that the image can be processed in terms of any of luminance and color. Exemplarily, during processing of the luminance components, no impact will be exerted on the color components of the image.

It should be noted that the RGB color mode, the YUV color mode, and the Lab color mode can be converted. With a mobile phone as an example, when an image is captured by an image capturing apparatus in the mobile phone, a method of generating the image in YUV color mode may include: converting, based on original data acquired by an image sensor, the original data into an image in RGB color mode; generating an image in YUV color mode according to the image in RGB color mode. The image capturing apparatus may be, for example, a camera. The camera may include a Charge-coupled Device (CCD) image sensor or a Complementary Metal Oxide Semiconductor (CMOS) image sensor. Based on the CCD image sensor or the CMOS image sensor, a light source signal captured is converted into RAW original data of a digital signal, is converted into image data in RGB color mode based on the RAW original data, and is further converted into image data in YUV color mode. In the image capturing apparatus of the mobile phone, an image in JPG format can be formed from an image in YUV color mode.

It should be noted that, the color in image data in RGB color mode formed by RAW original data conversion is not a real color of the image, and it is impossible to conduct any processing of the image data in RGB color mode formed herein; whereas the color formed in image data in YUV color mode is a real color of the image, and it is possible to conduct processing of the image data in YUV color mode. During commonly used image processing, it is customary to process RGB data, and the processing subjects original data captured by the image sensor into the following color mode conversion: RAW original data—image in RGB color mode—image in YUV color mode—image in RGB color mode, where the image in RGB color mode is subjected to processing operation to obtain a processed image in RGB color mode which is then converted into an image in YUV color mode, thereby making it possible to output and obtain an image in JPG format. Correspondingly, when images in other color modes are processed, it is necessary to convert the image in YUV color mode, and convert the processed image into an image in YUV color mode, thereby obtaining an image in JPG format.

In this embodiment, the acquired image in chrominance-luminance separation color mode may be an image in YUV color mode or an image in Lab color mode. When the image processing method of the present disclosure is applied to a mobile phone, the acquired image in chrominance-luminance separation color mode is an image in YUV color mode. It is possible to conduct processing when an image capturing device has captured the image in YUV color mode, without involving a need for redundant image conversion, thereby economizing the image conversion process and improving image processing efficiency.

In this embodiment, the image in chrominance-luminance separation color mode can be an image shot by the camera according to a shooting instruction, or can be image information captured by the camera and displayed on the screen of the electronic apparatus for the user's browsing before the shooting instruction is executed.

Exemplarily, a luminance component of each pixel point in the image is traversed. For example, in the image in YUV color mode, Y component of each pixel point in the image is extracted, and pixel points corresponding to the respective luminance components are put into statistics. Optionally, image data in YUV color mode is stored in planar format. In other words, three components of Y, U, and V are respectively stored in different matrices; and when the luminance components of the respective pixel points in the image are traversed, the matrix for storing the Y component is read, thereby making it possible to acquire the luminance components of the respective pixel points in the image.

Figure 1B:
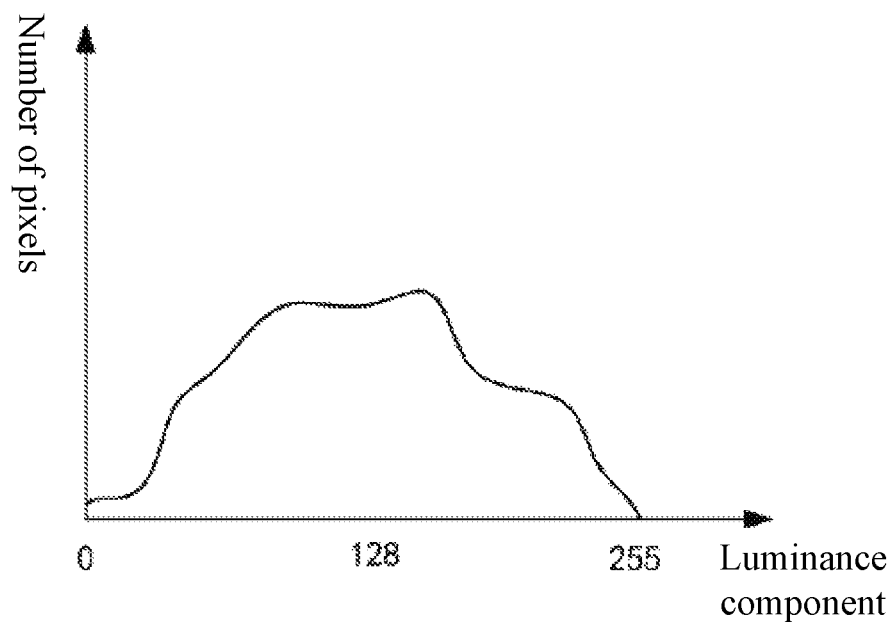
FIG. 1B is a diagram of an image luminance distribution map according to an embodiment of the present disclosure.

The luminance distribution may be displayed in the form of a histogram, a luminance distribution curve or an integral graph. Optionally, Block 103 may be: traversing luminance components of respective pixel points in the image, and generating luminance distribution of the image according to a traversing result of the luminance components. Exemplarily, referring to FIG. 1B, which is a diagram of an image luminance distribution map provided by an embodiment of the present disclosure. In FIG. 1B, a horizontal axis refers to respective luminance components of the image in a range of 0-255, and a vertical axis refers to the number of corresponding pixel points of each of the luminance components. The luminance distribution can reflect color luminance of the image. When a proportion of pixel points with luminance components of 1-128 is relatively large, it is shown that overall luminance of the image tends to be dark. When a proportion of pixel points with luminance components of 128-155 is relatively large, it is shown that overall luminance of the image tends to be bright.

Block 102a: A luminance mapping relation may be generated based on standard luminance distribution corresponding to a scene of the image and the luminance distribution of the image.

Figure 1C:
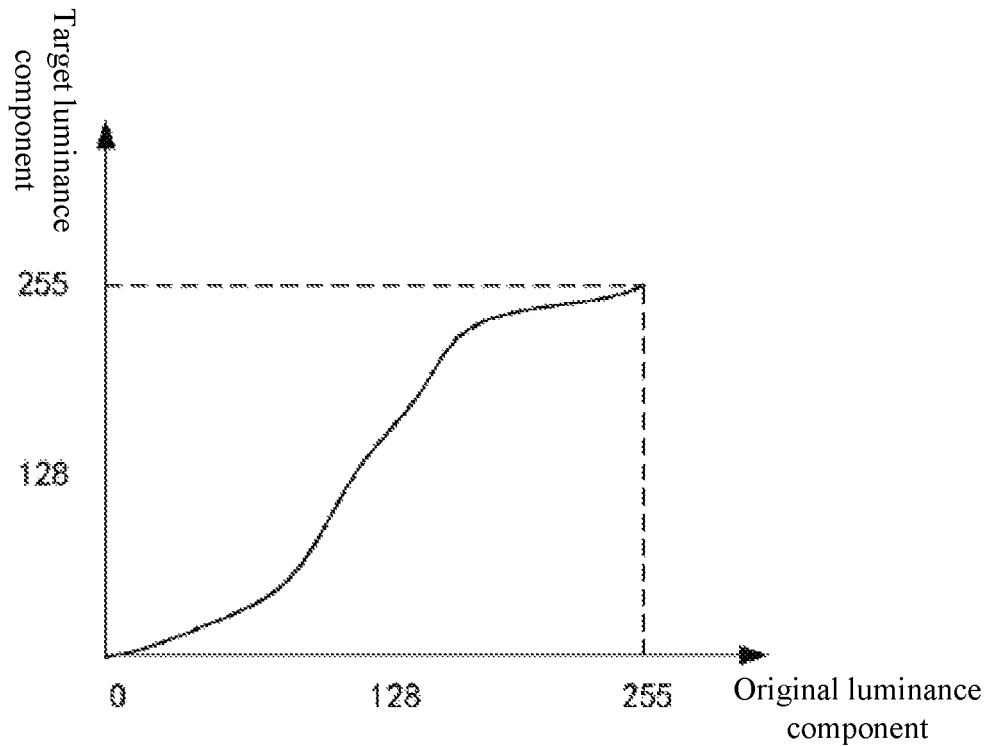
FIG. 1C is a curve diagram of a luminance mapping relation according to an embodiment of the present disclosure.

In this embodiment, standard luminance distribution is set for each image scene, which is used as a basis for adjusting luminance components of the image in a same scene. The standard luminance distribution includes a standard ratio of the number of corresponding pixel points of each of the luminance components of 0-255 to the number of pixel points of the entire image. When the luminance distribution of the image satisfies preset standard luminance distribution, the image satisfies the user's luminance requirement for the image. When a difference exists between the luminance distribution of the image and the preset standard luminance distribution, the luminance components of the pixel points in the image may be adjusted such that the luminance distribution of the image after the adjustment is consistent with the preset standard luminance distribution or falls within an allowable error range compared therewith. In this embodiment, a correspondence relation between original luminance components of the image and mapped luminance components is included in the luminance mapping relation, and can be used to adjust the luminance components of the pixel points in the image into mapped luminance components, and the luminance distribution of the image after the adjustment satisfies the preset standard luminance distribution. Exemplarily, as shown in FIG. 1C, FIG. 1C is a curve diagram of a luminance mapping relation provided by an embodiment of the present disclosure. The luminance mapping relation can be displayed in the form of a curve or a look up table (LUT), which is not limited in the present embodiment. FIG. 1C is only a curve display example of the luminance mapping relation. In FIG. 1C, the horizontal axis corresponding to the curve refers to original luminance components of the image, and the vertical axis corresponding to the curve refers to the adjusted luminance components.

In the present embodiment, the scene of the image may be automatically recognized by an electronic apparatus, or may be inputted by the user through a touch control operation or a voice command. When a scene recognition result of the electronic apparatus and an image scene inputted by the user exist at the same time, subsequent operation is performed preferably based on the image scene inputted by the user, to generate a luminance mapping relation.

Block 103a: The luminance components of the respective pixel points in the image may be adjusted according to the luminance mapping relation to generate a first processed image.

In the present embodiment, corresponding standard luminance distribution is adaptively identified according to the scene of the image, and a luminance mapping relation applicable to the image is determined, thereby brightening differential images in multiple scenes. As compared with being based on the same standard luminance distribution, the embodiment, based on the difference in the image scenes, performs different degrees of luminance mapping of the image to form differential processed images, thereby improving the effect of the processed image. Specifically, each pixel point in the image is traversed; a luminance component of each pixel point is acquired; a corresponding mapped luminance component of the luminance component is determined based on the luminance mapping relation; and the luminance component of each pixel point is adjusted into a mapped luminance component, to realize luminance adjustment of the image and thereby to obtain a first processed image.

The image processing method provided in the embodiment of the present disclosure adaptively selects standard luminance distribution corresponding to the scene through the scene of the image, generates a luminance mapping relation according to standard luminance distribution corresponding to the scene of the image and the luminance distribution of the image, and adjusts luminance components of respective pixel points in the image according to the luminance mapping relation to generate a first processed image, thereby making it possible to achieve an optimal effect for images in different scenes and improving applicability of the image processing manner. At the same time, since the method processes independent luminance components, without involving any adjustment of the color components, it is guaranteed that the image color remains as it is in the above image processing process, without affecting or changing the color during the processing process, and the guaranteed image color is clear without distortion.

Figure 1D:
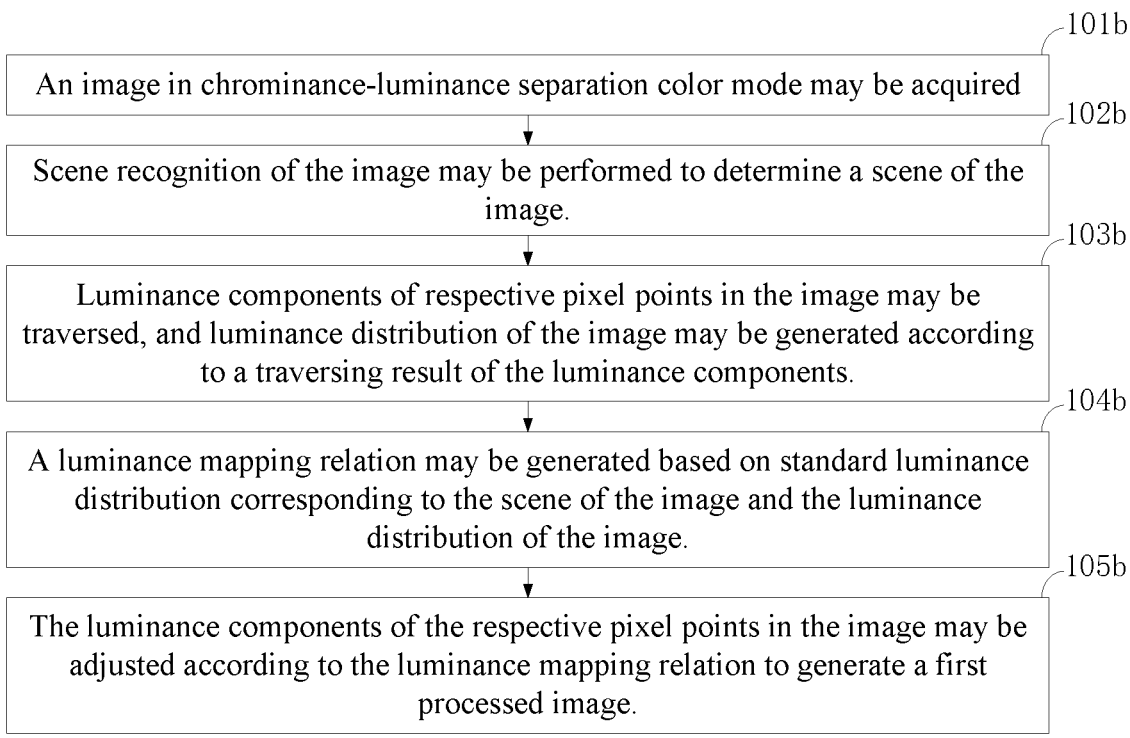
FIG. 1D is a flow chart diagram of an image processing method according to another embodiment of the present disclosure.

FIG. 1D is a flow chart diagram of an image processing method according to another embodiment of the present disclosure. The method can include actions or operations at blocks illustrated in FIG. 1D.

Block 101b: An image in chrominance-luminance separation color mode may be acquired.

Block 102b: Scene recognition of the image may be performed to determine a scene of the image.

Exemplarily, the scene of the image may include, but is not limited to, a portrait scene, a night scene, a sunset scene, a daylight scene, a backlight scene, and a night backlight scene, etc. It is possible to perform scene recognition of the image according to factors such as an object included in the image and a brightness-darkness ratio of the image. For example, it is possible to perform image recognition of the image based on a deep learning model which can be a convolutional neural network. A deep learning model having a scene recognition function is preset in the electronic apparatus. The deep learning model may be trained based on a supervised learning manner. For example, a large number of images are captured and a real scene of each image is marked as a training sample; and a sample image is inputted into a non-trained deep learning model to obtain an output scene. When the output scene of the deep learning model is inconsistent with the real scene, network parameters such as weight and offset value in the deep learning model are inversely adjusted according to a difference between the output scene and the real scene, and the above training process is executed cyclically until accuracy in the output scene of the deep learning model reaches preset accuracy, whereby the training of the deep learning model is completed.

Block 103b: Luminance components of respective pixel points in the image may be traversed, and luminance distribution of the image may be generated according to a traversing result of the luminance components.

Block 104b: A luminance mapping relation may be generated based on standard luminance distribution corresponding to the scene of the image and the luminance distribution of the image.

Block 105b: The luminance components of the respective pixel points in the image may be adjusted according to the luminance mapping relation to generate a first processed image.

Figure 2:
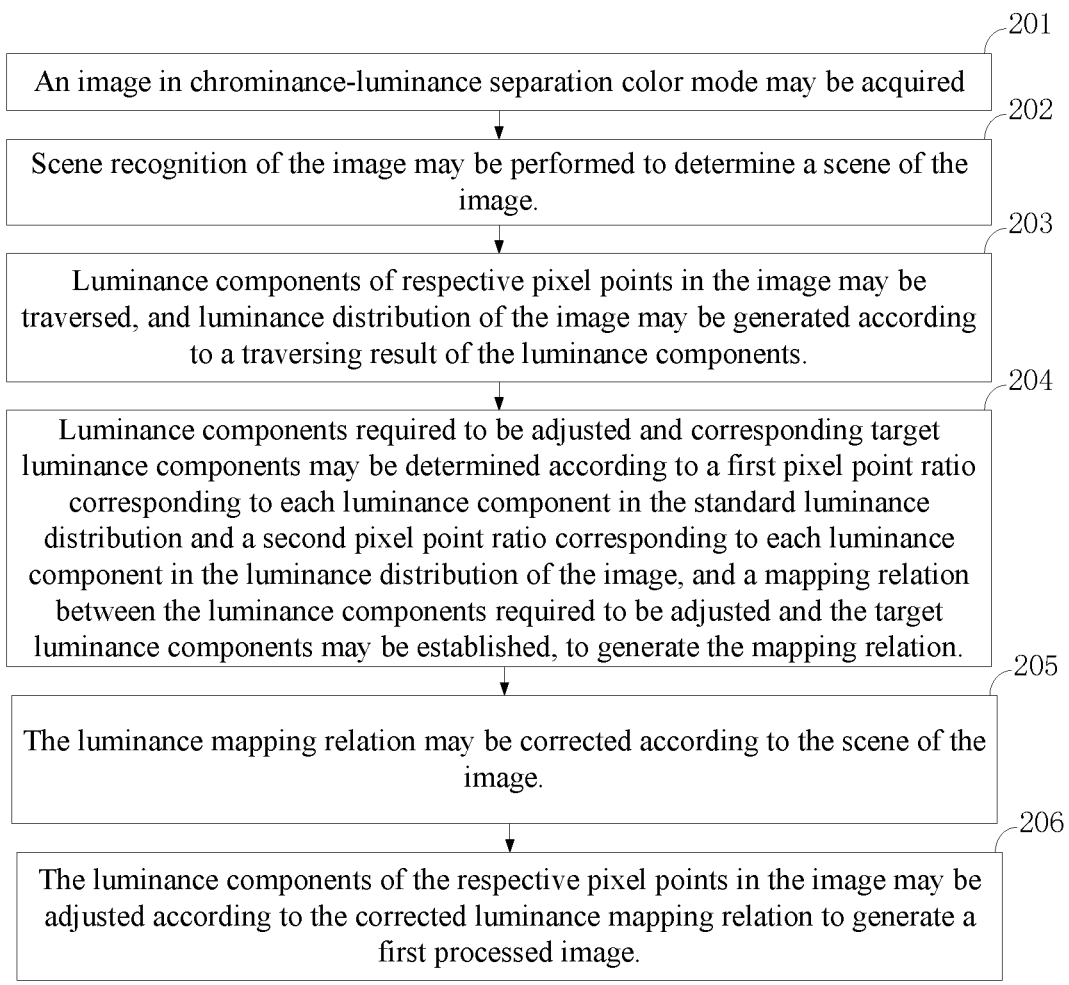
FIG. 2 is a flow chart diagram of another image processing method according to an embodiment of the present disclosure.

FIG. 2 is a flow chart diagram of another image processing method according to an embodiment of the present disclosure. The method can include actions or operations at blocks illustrated in FIG. 2.

Block 201: An image in chrominance-luminance separation color mode may be acquired.

Block 202: Scene recognition of the image may be performed to determine a scene of the image.

Block 203: Luminance components of respective pixel points in the image may be traversed, and luminance distribution of the image may be generated according to a traversing result of the luminance components.

Block 204: Luminance components required to be adjusted and corresponding target luminance components may be determined according to a first pixel point ratio corresponding to each luminance component in the standard luminance distribution and a second pixel point ratio corresponding to each luminance component in the luminance distribution of the image, and a mapping relation between the luminance components required to be adjusted and the target luminance components may be established, to generate the mapping relation.

Block 205: The luminance mapping relation may be corrected according to the scene of the image.

Block 206: The luminance components of the respective pixel points in the image may be adjusted according to the corrected luminance mapping relation to generate a first processed image.

In Block 204, for any of the luminance components, when the first pixel point ratio of the luminance component in the standard luminance distribution is different from the second pixel point ratio of the corresponding luminance component in the image, the luminance component in the image needs to be adjusted. The first pixel point ratio indicates a ratio of a number of pixel points in the standard luminance distribution corresponding to one luminance component to a total number of pixel points in the standard luminance distribution. The second pixel point ratio indicates a ratio of a number of pixel points in the luminance distribution of the image corresponding to one luminance component to a total number of pixel points in the luminance distribution of the image.

In some embodiments, when the first pixel point ratio of one luminance component is greater than the second pixel point ratio of the one luminance component, at least a subsequent luminance component of the one luminance component is mapped into the one luminance component, until the second pixel point ratio of the one luminance component equals to the first pixel point ratio of the one luminance component; and when the first pixel point ratio of one luminance component is less than the second pixel point ratio of the one luminance component, at least part of the one luminance component in the image is mapped into other luminance components, until the second pixel point ratio of the one luminance component equals to the first pixel point ratio of the one luminance component.

In other embodiments, when the first pixel point ratio of one luminance component is greater than the second pixel point ratio of the one luminance component, at least a subsequent luminance component of the one luminance component is mapped into the one luminance component, until the difference between the second pixel point ratio of the one luminance component and the first pixel point ratio of the one luminance component is within an allowable error range; and when the first pixel point ratio of one luminance component is less than the second pixel point ratio of the one luminance component, at least part of the one luminance component in the image is mapped into other luminance components, until the difference between the second pixel point ratio of the one luminance component and the first pixel point ratio of the one luminance component is within an allowable error range.

Specifically, when the first pixel point ratio of the first luminance component in the standard luminance distribution is greater than the second pixel point ratio of the first luminance component in the image, other luminance components need to be mapped into the first luminance component to increase the second pixel point ratio of the first luminance component in the image. The other luminance components are luminance components required to be adjusted; the first luminance component may be a target luminance component; and a mapping relation between the other luminance components and the target luminance component is established. Exemplarily, the other luminance components are luminance components in an interval adjacent to the first luminance component. A corresponding pixel point ratio of the other luminance components required to be adjusted may be the same as the difference between the first pixel point ratio and the second pixel point ratio, or is within an allowable error range as compared with the difference between the first pixel point ratio and the second pixel point ratio. Likewise, when the first pixel point ratio of the second luminance component in the standard luminance distribution is less than the second pixel point ratio of the second luminance component in the image to be processed, at least part of the second luminance component needs to be mapped into other luminance component to reduce the second pixel point ratio of the second luminance component in the image to be processed.

Alternatively, the respective luminance components are analyzed and processed in sequence according to value magnitudes of the luminance components, for example, in an ascending sequence of luminance components of 0 to 255, or in a descending sequence of luminance components of 255 to 0. For example, with the luminance component being 0 as an example, a manner of generating a luminance mapping relation is introduced. When the first pixel point ratio of the luminance component being 0 in the standard luminance distribution is 10%, greater than the second pixel point ratio of the luminance component being 0 in the image to be processed, which is 5%, a ratio difference, 5%, between the first pixel point ratio and the second pixel point ratio may be determined.

A pixel point ratio of a subsequent luminance component may be part of the luminance component required to be adjusted. If the pixel point of the subsequent luminance component is much less than the difference (5%), which is within an allowable error range, a further subsequent luminance component may further be part of the luminance component required to be adjusted, until the sum of the ratio of the luminance components required to be adjusted is equal to the difference or within the allowance error rage.

For example, if the pixel point ratio of the luminance component being 1 is 5%, all the luminance component being 1 is mapped into the luminance component being 0, and no other luminance components need to be mapped into 0.

If the pixel point ratio of the luminance component being 1 is 3%, all the luminance component being 1 is mapped into the luminance component being 0. If the allowable error range is less than 2%, the luminance component being 2 may be further mapped into 0; and if the allowable error range is less than 2%, no other luminance components need to be mapped into 0.

If the pixel point ratio of the luminance component being 2 is less than 2%, such as, 1%, all the luminance component being 2 may be further mapped into 0, and a determination of whether the luminance component being 3 is mapped into 0 may be further made through the same way as described above.

If the pixel point ratio of the luminance component being 2 is greater than 2%, such as, 7%, 2% of the luminance component being 2 may be mapped into 0, no any other luminance components need to be mapped into 0.

If the pixel ratio of the luminance component being 1 in the standard luminance distribution is 5%, nevertheless all the luminance component being 1 in the image is mapped into 0, that is, the pixel point ratio of the luminance component being 1 in the image is 0, the subsequence luminance component being 2 may be mapped into luminance component being 1. And the rest can be done in the same manner.

In another example, if the pixel point ratio of luminance components in an interval of 1-5 is identical or similar to the above-mentioned ratio difference, the luminance components in the interval of 1-5 are determined as luminance components required to be adjusted, the luminance component being 0 is taken as a target luminance component; and a mapping relation is established therebetween, i.e., the luminance components being 1-5 are mapped into the luminance component being 0 in the luminance mapping relation. In the same way, a luminance mapping relation is established.

It should be noted that luminance components of an image acquired by the electronic apparatus may in a range from 0 to 255, or may be in any sub-range of 0-255, for example, the luminance components may range from 30 to 200. In other words, the number of pixel points of the luminance components in the ranges of 0-30 and 200-255 in the image is 0. By establishing a luminance mapping relation, the range of 30-200 of the luminance components can be mapped into a range of 0-255 to realize extending the range of the luminance components of the acquired image, so that the bright region is brighter and the dark region is darker, thereby magnifying the color and improving definition of the image.

In Block 205, images in different scenes may have different emphases. For example, in a portrait scene, a human face region is a highlighted region of the image; in a sunset scene, cloud layer with a warm tone is a highlighted region of the image; and in a backlight mode, a backlight object is a highlight of the image. In this embodiment, a highlighted region of the image is determined according to a scene of the image, and the luminance components of the highlighted region of the image in the luminance mapping relation are corrected. Exemplarily, for an image including a human face, the mapped luminance component of the corresponding luminance components of the human face region is adjusted. Herein, the electronic apparatus is preset with correction manners of luminance mapping relations in different scenes; and the luminance mapping relation is adaptively corrected according to the scene of the image, so that the corrected luminance mapping relation is more suitable for the image in the scene.

The image processing method provided by the embodiment of the present disclosure determines a mapping relation of the luminance components via pixel point ratio of corresponding luminance components in the standard luminance distribution and the luminance distribution of the image to be processed, to establish a luminance mapping relation. After determining luminance components of the respective pixel points in the image, it is possible to rapidly determine a mapped target luminance component in a manner of accessing the luminance mapping relation, which improves image processing efficiency, reduces image processing time and ensures better user experience with respect to performing function mapping of each pixel point.

In some embodiments, Block 204 may further be: luminance components required to be adjusted and corresponding target luminance components may be determined according to a third pixel point ratio corresponding to a luminance component interval in the standard luminance distribution and a fourth pixel point ratio corresponding to a luminance component interval in the luminance distribution of the image, and a mapping relation between the luminance components required to be adjusted and the target luminance components may be established.

In some embodiments, when the first pixel point ratio of one luminance component interval is greater than the second pixel point ratio of the one luminance component interval, at least a subsequent luminance component interval of the one luminance component interval is mapped into the one luminance component interval, until the second pixel point ratio of the one luminance component interval equals to the first pixel point ratio of the one luminance component interval; and when the first pixel point ratio of one luminance component interval is less than the second pixel point ratio of the one luminance component interval, at least part of the one luminance component interval in the image is mapped into other luminance component intervals, until the second pixel point ratio of the one luminance component interval equals to the first pixel point ratio of the one luminance component interval.

In other embodiments, when the first pixel point ratio of one luminance component interval is greater than the second pixel point ratio of the one luminance component interval, at least a subsequent luminance component interval of the one luminance component interval is mapped into the one luminance component interval, until the difference between the second pixel point ratio of the one luminance component interval and the first pixel point ratio of the one luminance component interval is within an allowable error range; and when the first pixel point ratio of one luminance component interval is less than the second pixel point ratio of the one luminance component interval, at least part of the one luminance component interval in the image is mapped into other luminance component intervals, until the difference between the second pixel point ratio of the one luminance component interval and the first pixel point ratio of the one luminance component interval is within an allowable error range.

In this embodiment, the luminance component range of 0-255 is divided into a plurality of luminance component intervals, and the luminance components are analyzed and processed with luminance component intervals as units to establish a luminance mapping relation. The principle of establishing the luminance mapping relation herein is the same as the principle of establishing the luminance mapping relation in the above embodiment, and is not repeated herein.

Exemplarily, with a luminance component interval of 0-10 as an example, a manner of generating a luminance mapping relation is introduced. When the third pixel point ratio of the luminance component interval being 0-10 in the standard luminance distribution is greater than the fourth pixel point ratio of the luminance component interval being 0-10 in the image to be processed, a ratio difference between the third pixel point ratio and the fourth pixel point ratio may be determined. If the pixel point ratio of the luminance components in the interval of 10-15 is identical or similar to the above ratio difference, the luminance components in the interval of 0-15 are determined as luminance components required to be adjusted; the luminance component interval being 0-10 is taken as target luminance component; and a mapping relation is established therebetween. Exemplarily, the respective luminance components in the luminance component interval of 0-15 are each multiplied by ⅔ to obtain target luminance components. For example, a mapping relation is established between a luminance component 15 and a target luminance component 10; a mapping relation is established between a luminance component 12 and a target luminance component 8; a mapping relation is established between a luminance component 11 and a target luminance component 7, which is calculated by rounding; a mapping relation is established between a luminance component 9 and a target luminance component 6 . . . and the like. Correspondingly, mapping relations are determined in sequence for respective luminance component intervals in the luminance component range of 0-255 to establish a luminance mapping relation. The detail way of mapping is similar with that of mapping luminance component one by one, which is not recited herein.

Therein, the greater the luminance component interval is, the faster the establishing speed of the luminance mapping relation may be, and the worse accuracy in the luminance mapping relation may be. Correspondingly, the smaller the luminance component interval is, the slower the establishing speed of the luminance mapping relation may be, and the higher accuracy in the luminance mapping relation may be. The division of luminance component intervals can be determined by measuring the establishing speed and accuracy of the luminance mapping relation.

Figure 3:
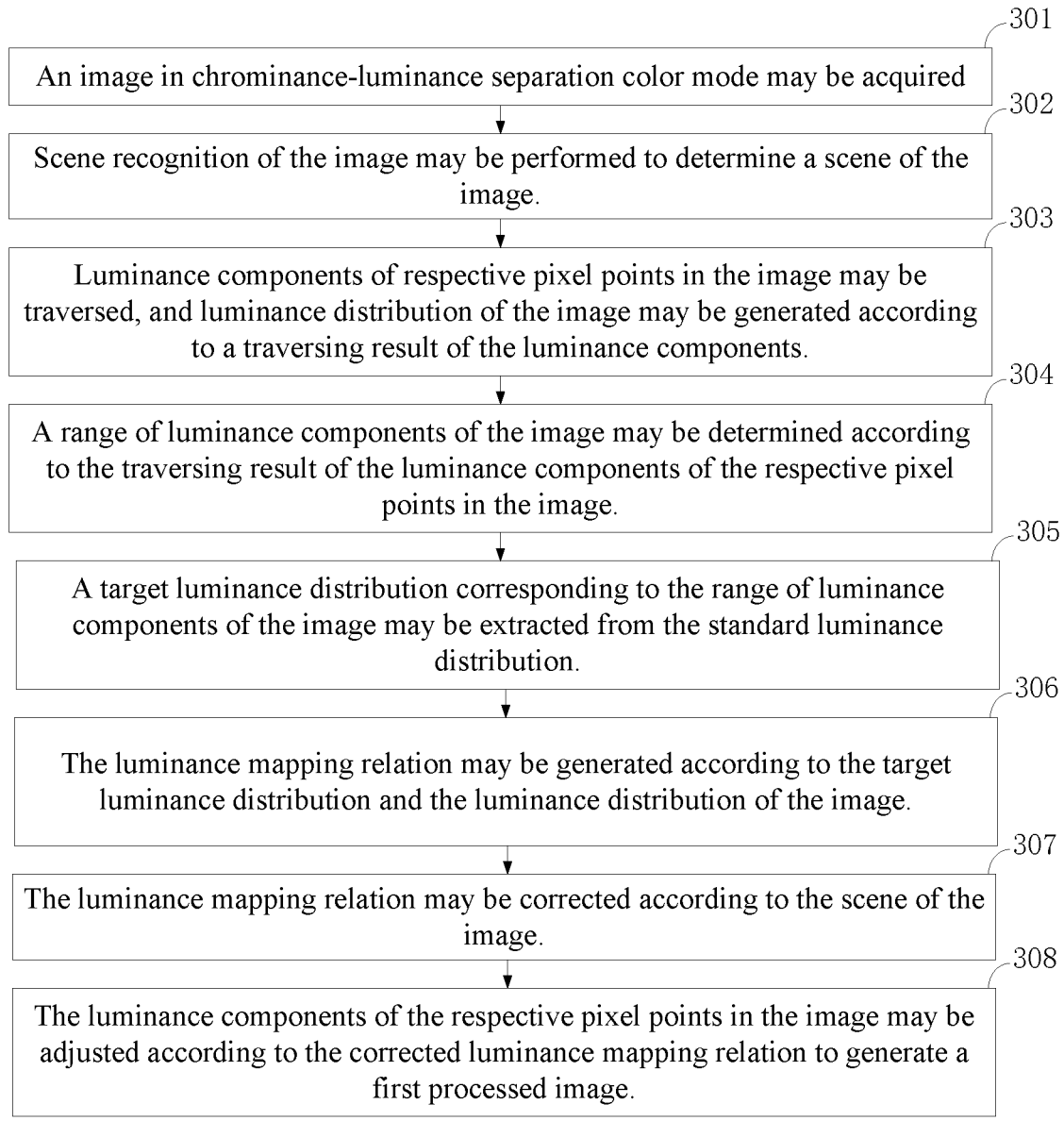
FIG. 3 is a flow chart diagram of another image processing method according to an embodiment of the present disclosure.

FIG. 3 is a flow chart diagram of another image processing method according to an embodiment of the present disclosure. This embodiment is an optional solution of the foregoing embodiment. Correspondingly, the method can include actions or operations at blocks illustrated in FIG. 3.

Block 301: An image in chrominance-luminance separation color mode may be acquired.

Block 302: Scene recognition of the image may be performed to determine a scene of the image.

Block 303: Luminance components of respective pixel points in the image may be traversed, and luminance distribution of the image may be generated according to a traversing result of the luminance components.

Block 304: A range of luminance components of the image may be determined according to the traversing result of the luminance components of the respective pixel points in the image.

Block 305: A target luminance distribution corresponding to the range of luminance components of the image may be extracted from the standard luminance distribution.

Block 306: The luminance mapping relation may be generated according to the target luminance distribution and the luminance distribution of the image.

Block 307: The luminance mapping relation may be corrected according to the scene of the image.

Block 308: The luminance components of the respective pixel points in the image may be adjusted according to the corrected luminance mapping relation to generate a first processed image.

In Block 305, a maximum value and a minimum value of the luminance components in the image are determined according to the traversing result of the luminance components of the respective pixel points in the image. It can be further learned that, the range of luminance components of the image is a range between the minimum value and the maximum value. For example, if the maximum value of the luminance components is 200 and the minimum value is 50, the luminance components of the image range from 50 to 200. If the luminance component range of the image acquired by the electronic apparatus is a sub-range of a luminance range of 0 to 255, standard luminance distribution is subjected to extraction according to the maximum value and the minimum value of the luminance components in the image to obtain a portion between the maximum value and the minimum value in the standard luminance distribution as target luminance distribution. For example, when the range of luminance components of the image is 50 to 200, a portion in which the luminance components are 50 to 200 in the standard luminance distribution is extracted as target luminance distribution.

In Block 306, the principle of generating the luminance mapping relation based on the target luminance distribution and the luminance distribution of the image is the same as the principle of generating the luminance mapping relation according to the preset standard luminance distribution and the luminance distribution of the image, and is omitted herein. Therein, analysis can be made with a luminance component as a unit or with a luminance component interval as a unit, to establish a luminance mapping relation.

The image processing method provided by the embodiment of the present disclosure determines a range of luminance components of the image according to the traversing result of the luminance components of the pixel points in the image, extracts target luminance distribution corresponding to the range of luminance component of the image from the preset standard luminance distribution, generates the luminance mapping relation according to the target luminance distribution and the luminance distribution of the image, and adjusts the luminance components of the image to generate a processed image. Within the range of luminance components of the image, luminance of the image is adjusted to a standard state and is reasonably adjusted, thereby improving quality of the image.

Figure 4:
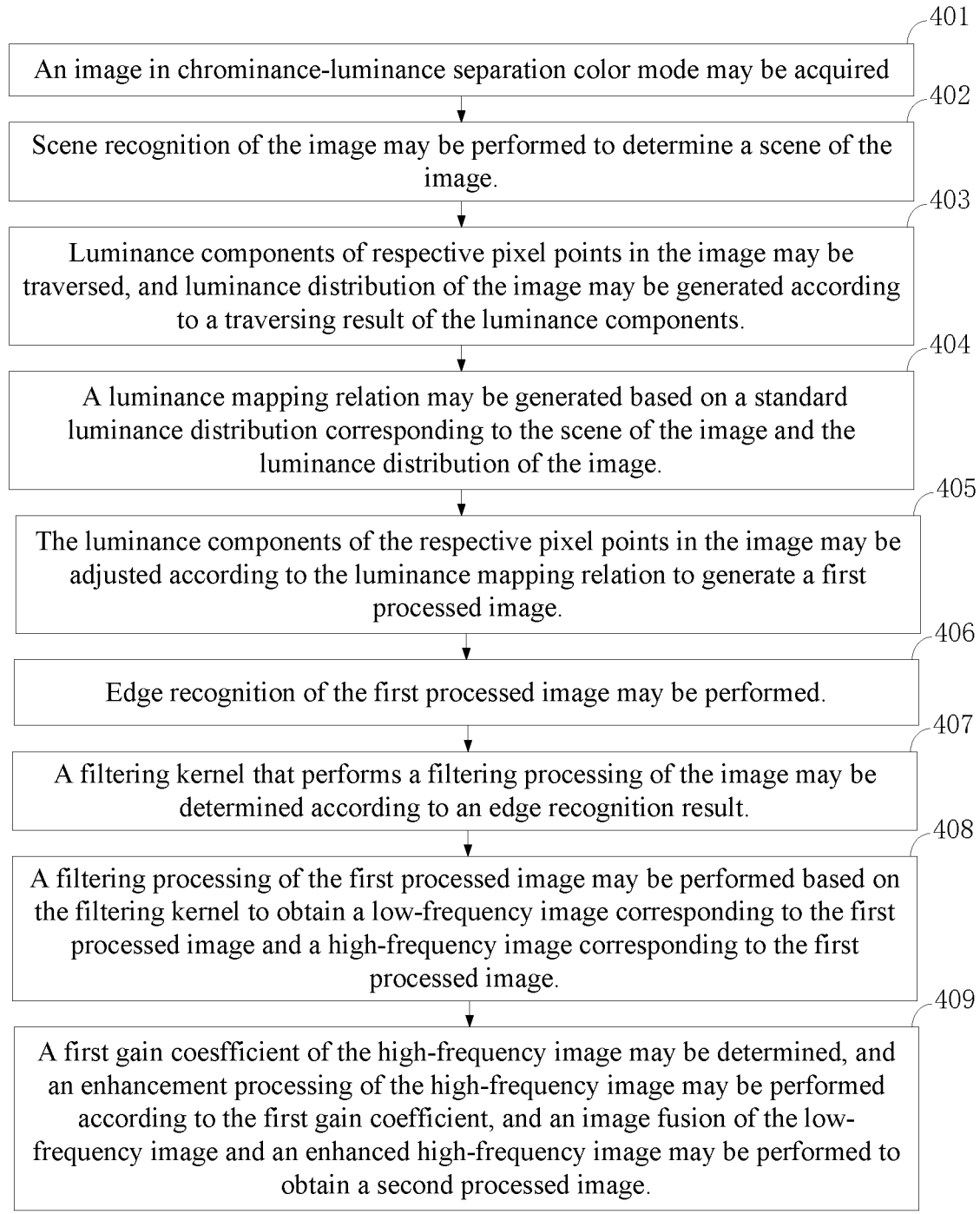
FIG. 4 is a flow chart diagram of another image processing method according to an embodiment of the present disclosure.

FIG. 4 is a flow chart diagram of another image processing method according to an embodiment of the present disclosure. This embodiment is an optional solution of the foregoing embodiment. Correspondingly, the method can include actions or operations at blocks illustrated in FIG. 4.

Block 401: An image in chrominance-luminance separation color mode may be acquired.

Block 402: Scene recognition of the image may be performed to determine a scene of the image.

Block 403: Luminance components of respective pixel points in the image may be traversed, and luminance distribution of the image may be generated according to a traversing result of the luminance components.

Block 404: A luminance mapping relation may be generated based on a standard luminance distribution corresponding to the scene of the image and the luminance distribution of the image.

Block 405: The luminance components of the respective pixel points in the image may be adjusted according to the luminance mapping relation to generate a first processed image.

Block 406: Edge recognition of the first processed image may be performed.

Block 407: A filtering kernel that performs a filtering processing of the image may be determined according to an edge recognition result.

Block 408: A filtering processing of the first processed image may be performed based on the filtering kernel to obtain a low-frequency image corresponding to the first processed image and a high-frequency image corresponding to the first processed image.

Block 409: A first gain coefficient of the high-frequency image may be determined, and an enhancement processing of the high-frequency image may be performed according to the first gain coefficient, and an image fusion of the low-frequency image and an enhanced high-frequency image may be performed to obtain a second processed image.

In Block 406, edge recognition may be performed on the image to extract a boundary line between the object and background in the image. Contour points in the image may be roughly detected first, and then the detected contour points are connected through a link rule; and meanwhile, omitted boundary points are also detected and connected, with false boundaries removed. The purpose of the edge recognition is to discover information on shape and reflection or transmittance in the image. Exemplarily, adjacent pixel values or luminance values of the pixel points of the image may be detected row by row and column by column to determine pixel points whose pixel values or luminance value change wildly, as edge pixel points which are connected to form an edge. Exemplarily, performing edge recognition of the image may also be calculating the image based on the following but not limited to a Roberts edge operator, a Sobel edge detection operator, or a Laplacan edge operator.

In Block 407, the edge recognition result can be outputting edge information in the image, or generating characteristic values characterizing the edge information based on the recognized edge information. The filtering kernel is an operator kernel of a filter that performs filtering processing of the image. Filtering kernels with different sizes have different filtering effects. For example, a filter with a smaller filtering kernel, when performing filtering processing, may preserve small details in the image, whereas a filter with a larger filtering kernel, when performing filtering processing, may preserve a large contour in the image. Exemplarily, the filtering kernel may be, but not limited to, 3×3, 5×5, 7×7, or 9×9, etc.

In this embodiment, image contents captured by the electronic apparatus when shooting different objects to be shot differ largely. By performing edge recognition of the image, a filtering kernel applicable to the image is determined, so that the image contents are preserved in the filtering process, thereby preventing loss of detail information or contour information in the image. Alternatively, determining the filtering kernel that performs filtering processing of the image according to the scene recognition result may be realized as the follows: an edge coefficient in the image may be determined according to the scene recognition result; and a size of the filtering kernel that performs filtering processing of the image may be determined according to the edge coefficient, where the size of the filtering kernel may be positively correlated with the edge coefficient. The edge coefficient of the image may be a characteristic value used to characterize the edge information. Exemplarily, the larger the edge coefficient is, the more edge information the image may include. Whereas the smaller the edge coefficient is, the less edge information the image may include. In order to preserve the information in the image, the size of the filtering kernel is positively correlated with the edge coefficient, i.e., the larger the edge coefficient of the image is, the larger filtering kernel will be applied to the image. For example, when the image includes a white desktop, and black buttons and spotted stains on the desktop, it can be learned that, the image is relatively flat and contains less edge information, and an edge coefficient derived from the edge recognition of the image is smaller, and correspondingly, the filtering kernel applicable to the image is smaller, for example, could be a 3×3 filtering kernel. When the image includes a plurality of tables, chairs, cabinets, and a plurality of objects on the table, it can be learned that, the image is more complicated and contains more edge information, and an edge coefficient derived from the edge recognition of the image is larger, and correspondingly, the filtering kernel applicable to the image is larger, for example, could be a 9×9 filtering kernel.

Optionally, according to the edge recognition result of the image, a position of the edge information in the image is determined; the image is subjected to region division; the region where the edge information is present is subjected to filtering processing by means of a larger filtering kernel; the background region of the image is subjected to filtering processing by means of a smaller filtering kernel; and the image is subjected to filtering processing based on a dynamic filtering kernel, thereby preserving contour information and detail information of the image, so as to avoid loss of the image information.

In Block 408, a filter for filtering the image is a low-pass filter, and correspondingly, the image is subjected to low-pass filtering processing. Specifically, the image is subjected to low-pass filtering processing based on the low-pass filter, to obtain a low-frequency image corresponding to the original image; and by subtracting the low-frequency image from the original image, it is possible to obtain a high-frequency image corresponding to the original image. Specifically, calculating pixel difference value of corresponding pixel points of the original image and the low-frequency image to obtain a high-frequency image corresponding to the original image.

In Block 409, the high-frequency image may include content information in the original image, and is subjected to enhancement processing, so that contrast between the enhanced high-frequency image and the low-frequency image could be enhanced. A dynamic range of the image is further adjusted to highlight the object in the image and improve definition of the image. Exemplarily, the manner of performing the enhancement processing to the high-frequency image may be: an enhancement coefficients of the pixel points in the high-frequency image is set; the enhancement coefficients are multiplied by the pixel values or luminance values of the pixel points, respectively; and the enhanced high-frequency image and the low-frequency image are subjected to image fusion to obtain a processed image. The enhancement coefficients for performing enhancement processing of the high-frequency image may be a fixed value, i.e., the enhancement coefficients of the respective pixel points are identical. Alternatively, the enhancement coefficients for performing enhancement processing of the high-frequency image may also be calculated according to each pixel point, and differ according to differences in the respective pixel points. Correspondingly, when the high-frequency image is subjected to enhancement processing, the pixel value or luminance value of each pixel point is multiplied by a corresponding enhancement coefficient to obtain a high-quality enhanced image.

The image processing method provided in the embodiment of the present disclosure sequentially performs color amplification processing and contrast improvement processing on the image captured by the camera, and processes independent luminance components without involving color components. In other words, on the basis of not damaging the color, the method adjusts a dynamic range and virtual mode of the color to improve image luminance and image detail definition.

Figure 5:
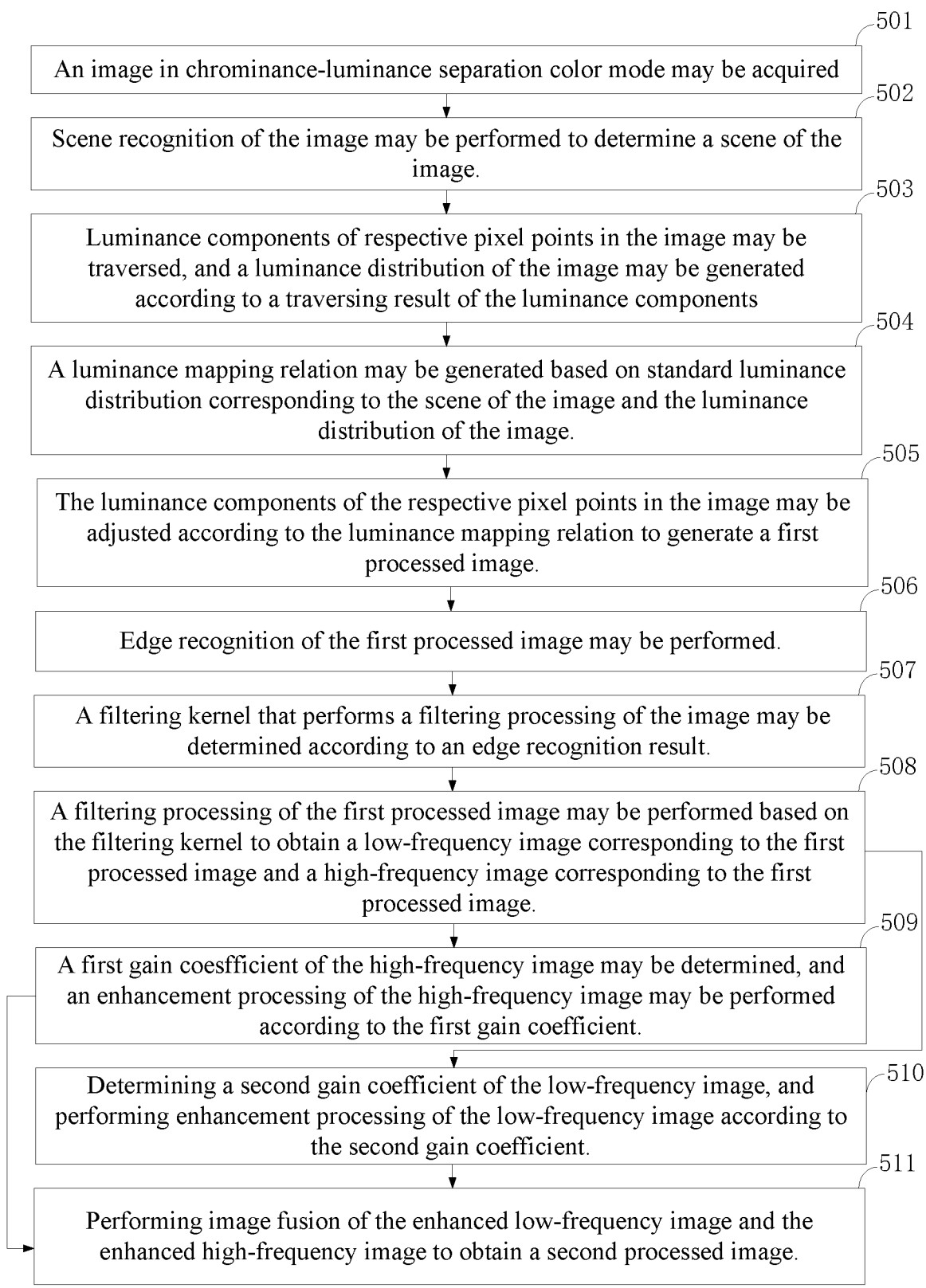
FIG. 5 is a flow chart diagram of another image processing method according to an embodiment of the present disclosure.

FIG. 5 is a flow chart diagram of another image processing method according to an embodiment of the present disclosure. This embodiment is an optional solution of the foregoing embodiment. Correspondingly, the method can include actions or operations at blocks illustrated in FIG. 5.

Block 501: An image in chrominance-luminance separation color mode may be acquired.

Block 502: Scene recognition of the image may be performed to determine a scene of the image.

Block 503: Luminance components of respective pixel points in the image may be traversed, and a luminance distribution of the image may be generated according to a traversing result of the luminance components.

Block 504: A luminance mapping relation may be generated based on standard luminance distribution corresponding to the scene of the image and the luminance distribution of the image.

Block 505: The luminance components of the respective pixel points in the image may be adjusted according to the luminance mapping relation to generate a first processed image.

Block 506: Edge recognition of the first processed image may be performed.

Block 507: A filtering kernel that performs a filtering processing of the image may be determined according to an edge recognition result.

Block 508: A filtering processing of the first processed image may be performed based on the filtering kernel to obtain a low-frequency image corresponding to the first processed image and a high-frequency image corresponding to the first processed image.

Block 509: A first gain coefficient of the high-frequency image may be determined, and an enhancement processing of the high-frequency image may be performed according to the first gain coefficient.

Block 510: Determining a second gain coefficient of the low-frequency image, and performing enhancement processing of the low-frequency image according to the second gain coefficient.

Block 511: Performing image fusion of the enhanced low-frequency image and the enhanced high-frequency image to obtain a second processed image.

In Block 508, luminance components of the first processed image may be subjected to low-pass filtering processing. For example, in YUV color mode, only the Y component is subjected to filtering processing to obtain a high-frequency image and a low-frequency image associated with the Y component; and subsequent enhancement processing involves adjustment and transformation of the Y component, which does not affect a ratio between the U component and the V component at all. As such, it is guaranteed that the color of the image is not distorted during the processing, and contrast of the image is improved without damaging the color.

In Block 509, in the high-frequency image, a local variance of a window region with a reference pixel point as a center may be calculated based on a window of a preset size; a gain value of the reference pixel point may be determined according to a local standard deviation corresponding to the local variance of the window region. The gain value of each of the pixel points may be determined by the same way described above. The first gain coefficient of the high-frequency image may be determined according to the gain values of all the pixel points. The reference pixel point is any (i,j) of the pixel points in the image and its luminance component is x (i,j), where i is horizontal coordinates of the reference pixel points in the image, and j is vertical coordinates of the reference pixel points in the image. The window size may be (2n+1)·(2n+1), n is an integer greater than or equal to 0. The above window size is only an example. In other examples, the above window may be in the form of a rectangle, i.e., (2n+1)·(2m+1).

The local variance of the window region can be calculated via the following formula:

$$\sigma_x^2(i, j) = \frac{1}{(2n+1)^2} \sum_{k=i-n}^{i+n} \sum_{l=j-n}^{j+n} [x(k, l) - m_x(i, j)]^2,$$

$$m_x(i, j) = \frac{1}{(2n+1)^2} \sum_{k=i-n}^{i+n} \sum_{l=j-n}^{j+n} x(k, l).$$

In the above formula, $m_x(i,j)$ is a local average value of the window region; $x(k,l)$ is a luminance component of the pixel point in the window, and k and l are integers greater than or equal to 0.

Therein, $\sigma_x(i,j)$ is a local standard deviation of the window region with the reference pixel point as a center. In some embodiments, the gain value of the reference pixel point is inversely proportional to the local standard deviation, for example, the gain value of the reference pixel point may be $D/\sigma_x(i,j)$. In some embodiments, the gain value of the reference pixel point is greater than one to achieve enhancement of the luminance components of the pixel points in the high-frequency image, where D is a constant.

In this embodiment, in the above manner, the gain value of each pixel point in the high-frequency image is determined, and the first gain coefficient of the high-frequency image is further determined.

In some embodiments, after the first gain coefficient is determined, the method may further include: correcting the first gain coefficient according to the scene recognition result of the image. Exemplarily, the scene recognition result of the image may be determining a ratio of high-frequency information and low-frequency information in the image. When the ratio of the high-frequency information and the low-frequency information is relatively large, it is shown that the high-frequency image contains a large number of pixel points to be enhanced. When the high-frequency image is enhanced according to the first gain coefficient, the image noise is easily amplified to generate image excess, which affects the image quality. In this embodiment, when the ratio of the high-frequency information and the low-frequency information is relatively large, the first gain coefficient is corrected, and adaptively reduced, thereby realizing dynamically adjusting the first gain coefficient according to the scene recognition result of the image and achieving the effect of not enhancing noise.

In Block 510, the manner of determining the second gain coefficient of the low-frequency image is identical to the manner of determining the first gain coefficient of the high-frequency image, and details are not described herein.

In this embodiment, the first gain coefficient and the second gain coefficient are calculated respectively for the high-frequency image and the low-frequency image obtained by performing filtering processing of the luminance components of the first processed image in chrominance-luminance separation color mode. The high-frequency image is subjected to enhancement processing according to the first gain coefficient, and the low-frequency image is subjected to enhancement processing according to the second gain coefficient. The enhanced low-frequency image and the enhanced high-frequency image are subjected to image fusion to obtain a processed image. Meanwhile, contrast in the high-frequency image and the low-pass image is enhanced, thereby avoiding loss of details during the image processing and improving the image definition on the basis of no distortion in the image.

Figure 6:
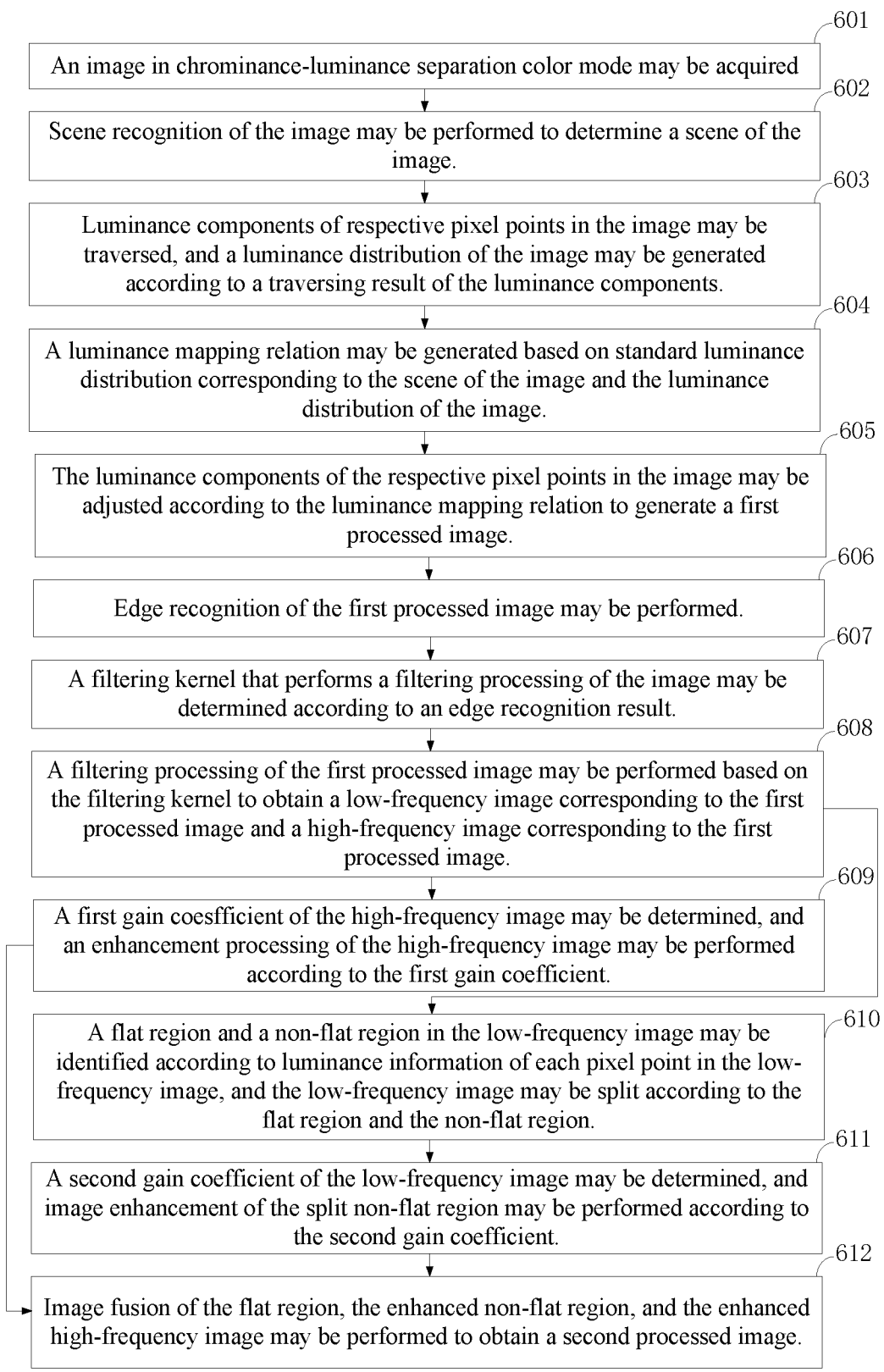
FIG. 6 is a structural block diagram of another image processing method according to an embodiment of the present disclosure.

FIG. 6 is a flow chart diagram of another image processing method according to an embodiment of the present disclosure. This embodiment is an optional solution of the foregoing embodiment. Correspondingly, the method can include actions or operations at blocks illustrated in FIG. 6.

Block 601: An image in chrominance-luminance separation color mode may be acquired.

Block 602: Scene recognition of the image may be performed to determine a scene of the image.

Block 603: Luminance components of respective pixel points in the image may be traversed, and a luminance distribution of the image may be generated according to a traversing result of the luminance components.

Block 604: A luminance mapping relation may be generated based on standard luminance distribution corresponding to the scene of the image and the luminance distribution of the image.

Block 605: The luminance components of the respective pixel points in the image may be adjusted according to the luminance mapping relation to generate a first processed image.

Block 606: Edge recognition of the first processed image may be performed.

Block 607: A filtering kernel that performs a filtering processing of the image may be determined according to an edge recognition result.

Block 608: A filtering processing of the first processed image may be performed based on the filtering kernel to obtain a low-frequency image corresponding to the first processed image and a high-frequency image corresponding to the first processed image.

Block 609: A first gain coefficient of the high-frequency image may be determined, and an enhancement processing of the high-frequency image may be performed according to the first gain coefficient.

Block 610: A flat region and a non-flat region in the low-frequency image may be identified according to luminance information of each pixel point in the low-frequency image, and the low-frequency image may be split according to the flat region and the non-flat region.

Block 611: A second gain coefficient of the low-frequency image may be determined, and image enhancement of the split non-flat region may be performed according to the second gain coefficient.

Block 612: Image fusion of the flat region, the enhanced non-flat region, and the enhanced high-frequency image may be performed to obtain a second processed image.

In Block 610, identifying a flat region and a non-flat region in the low-frequency image according to luminance information of the respective pixel points in the low-frequency image may include: performing partitioning processing of the low-frequency image to obtain a plurality of image regions, and determining a pixel difference value of the image regions; determining the image regions to belong to a flat region when the pixel difference value of the image regions is smaller than or equal to a preset value; and determining the image regions to belong to a non-flat region when the pixel difference value of the image regions is greater than the preset value.

For any of the image regions, the pixel difference value in the image region may be calculated by the following formula:

$$A = \frac{1}{p} \sum_{b=1}^{p} (g_b - \bar{g})$$

wherein A is a pixel difference value of the image region; P is a total number of pixel points in the image region; $g_b$ (b=1, 2, ... p) is a luminance component of each pixel in the image region; $\bar{g}$ is a local luminance mean value of the image region; and both P and b are positive integers greater than 0.

The pixel difference value represents a difference condition of luminance information of the respective pixel points in the image region. For example, a larger pixel difference value indicates that luminance information of the respective pixel points in the image region differs largely, and a smaller pixel difference value indicates that the luminance information of the respective pixel points in the image region has higher similarity. The image regions whose pixel difference values are smaller than or equal to the preset value are spliced to form a flat region, and the image regions whose pixel difference values are larger than the preset value are spliced to form a non-flat region. Optionally, the preset value for determining the flat region and the non-flat region is related to an average local difference value $\bar{A}$ of the low-frequency image. Specifically, according to the number of image regions and the pixel difference value A of the respective image regions, it is possible to determine the average local difference value $\bar{A}$ in the low-frequency image and introduce a coefficient $\lambda$. The preset value may be $\lambda\bar{A}$. In other words, when the pixel difference value of the image regions is $A \leq \lambda\bar{A}$, the image regions belong to a flat region; and when the pixel difference value is $A > \lambda\bar{A}$, the image regions belong to a non-flat region.

Exemplarily, for an image including black buttons and spotted stains on the white desktop, the high-frequency image obtained via the filtering processing may include black buttons, and the low-frequency image includes the white desktop and spotted stains on the desktop. In the low-frequency image, a portion where the dotted stains are present is a non-flat region; and the background region of the white desktop is a flat region. In the above embodiment, it can be learned that, the gain value of the pixel point is inversely proportional to the local standard deviation. In the flat region, the local standard deviation is quite small, so that the gain value of the pixel point is relatively large, thereby resulting in noise amplification.

In Block 611, the flat region and the non-flat region in the low-frequency image are identified and split; only the non-flat region is subjected to enhancement processing; and the luminance component of the flat region is not adjusted, thereby avoiding amplification of the noise of the plat region when performing enhancement processing of the image.

The image processing method provided in the embodiment of the present disclosure adaptively maps the luminance components of the image based on standard luminance distribution of the image scene, and virtually amplifies the color of the image to obtain a first processed image. The method further includes subjecting the first processed image into low-pass filtering processing, and performing enhancement processing of the obtained high-frequency image, and performing enhancement processing of the non-flat region of the low-frequency image to realize enhancing the image details, maintaining the flat region of the low-frequency image to control the noise, thereby avoiding amplification of the noise while increasing contrast of the image.

Figure 7:
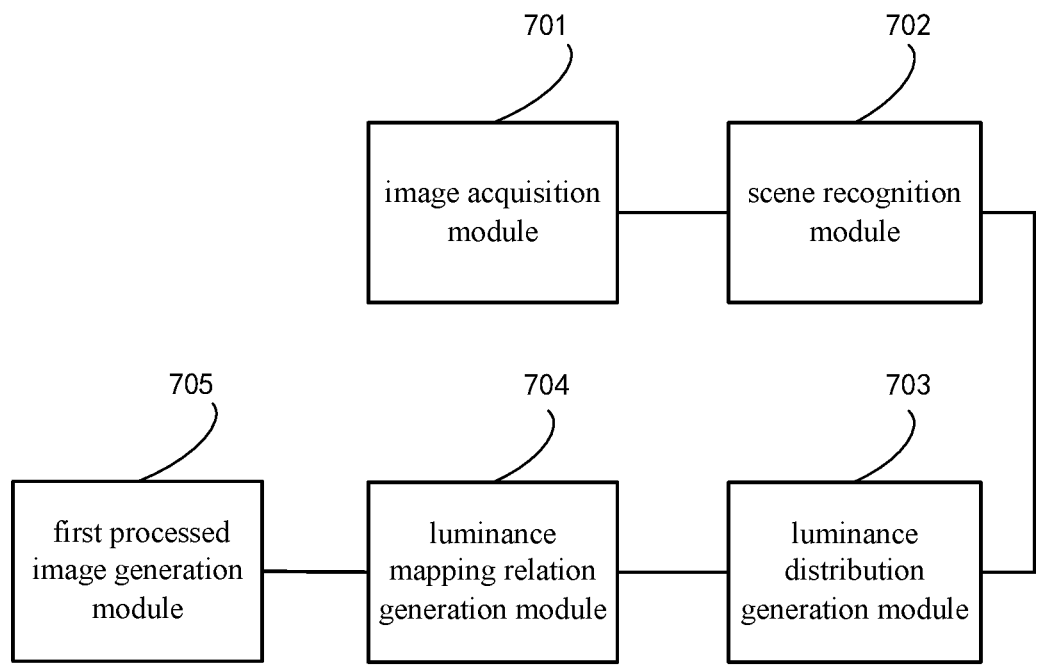
FIG. 7 is a structural diagram of an image processing device according to an embodiment of the present disclosure.

FIG. 7 is a structural block diagram of an image processing device according to an embodiment of the present disclosure. The device, which may be implemented by software and/or hardware, is generally integrated in an electronic apparatus. It is possible to process an image captured by the camera by performing the image processing method of the electronic apparatus. As shown in FIG. 7, the device may include: an image acquisition module 701, a scene recognition module 702, a luminance distribution generation module 703, a luminance mapping relation generation module 704, and a first processed image generation module 705.

The image acquisition module 701 may be configured to acquire an image in a chrominance-luminance separation color mode.

The scene recognition module 702 may be configured to perform scene recognition of the image to determine a scene of the image.

The luminance distribution generation module 703 may be configured to traverse luminance components of respective pixel points in the image and to generate a luminance distribution of the image according to a traversing result of the luminance components.

The luminance mapping relation generation module 704 may be configured to generate a luminance mapping relation based on a standard luminance distribution corresponding to the scene of the image and the luminance distribution of the image.

The first processed image generation module 705 may be configured to adjust the luminance components of the respective pixel points in the image according to the luminance mapping relation to generate a first processed image.

The image processing device provided in the embodiment of the present disclosure can achieve an optimal effect for images of different scenes, thereby improving applicability of the image processing manner. Since the device processes independent luminance components, without involving any adjustment of color components, it is guaranteed that the image color remains as it is in the above image processing process, without affecting or changing the color in the processing process, and the guaranteed image color is clear without distortion.

Based on the foregoing embodiment, the luminance mapping relation generation module 704 may be configured to according to a first pixel point ratio corresponding to each luminance component in the standard luminance distribution and a second pixel point ratio corresponding to each luminance component in the luminance distribution of the image, determine luminance components required to be adjusted and corresponding target luminance components, and establish a mapping relation between the luminance components required to be adjusted and the target luminance components; or according to a third pixel point ratio corresponding to a luminance component interval in the standard luminance distribution and a fourth pixel point ratio corresponding to a luminance component interval in the luminance distribution of the image, determine luminance components required to be adjusted and corresponding target luminance components, and establish a mapping relation between the luminance components required to be adjusted and the target luminance components.

Based on the above embodiments, the luminance mapping relation generation module 704 may be configured to determine a range of luminance components of the image according to the traversing result of the luminance components of the respective pixel points in the image; extract a target luminance distribution corresponding to the range of luminance components of the image from the preset standard luminance distribution; and generate the luminance mapping relation according to the target luminance distribution and the luminance distribution of the image.

Based on the above embodiments, the device may further include a luminance mapping relation correction module configured to correct the luminance mapping relation according to the scene of the image after generating the luminance mapping relation.

Based on the above embodiments, the device may further include: an edge recognition module, configured to: perform edge recognition of a first processed image after generating the first processed image; a filtering kernel determining module configured to determine a filtering kernel that performs filtering processing of the image according to the edge recognition result; a filtering processing module configured to perform a filtering processing of the first processed image based on the filtering kernel, to obtain a low-frequency image corresponding to the first processed image and a high-frequency image corresponding to the first processed image; and a high-frequency image enhancement module configured to determine a first gain coefficient of the high-frequency image and to perform an enhancement processing of the high-frequency image according to the first gain coefficient; and a second processed image generation module configured to perform image fusion of the low-frequency image and the enhanced high-frequency image to obtain a second processed image.

Based on the above embodiments, the device may further include a low-frequency image enhancement module configured to determine a second gain coefficient of the low-frequency image, and performing an enhancement processing of the low-frequency image according to the second gain coefficient.

Correspondingly, the second processed image generation module may be configured to perform image fusion of the enhanced low-frequency image and the enhanced high-frequency image to obtain a second processed image.

Based on the above embodiments, the high-frequency image enhancement module may include a first local variance calculation unit configured to calculate, based on a window of a preset size, a local variance of a window region with a reference pixel point as a center for the high-frequency image; a first gain value determining unit configured to determine a gain value of the reference pixel point according to a local standard deviation corresponding to the local variance of the window region; and a first gain coefficient determining unit configured to determine a first gain coefficient of the high-frequency image according to the gain values of all the reference pixel points in the high-frequency image.

Based on the above embodiments, the low-frequency image enhancement module may further include: a second local variance calculation unit configured to calculate, calculate, based on a window of a preset size, a local variance of a window region with a reference pixel point as a center for the low-frequency image; a second gain value determining unit configured to determine a gain value of the reference pixel point according to a local standard deviation corresponding to the local variance of the window region; and a second gain coefficient determining unit configured to determine a second gain coefficient of the high-frequency image according to the gain values of all the reference pixel points in the high-frequency image.

Based on the above embodiments, the low-frequency image enhancement module may include: an image recognition unit configured to identify a flat region and a non-flat region in the low-frequency image according to luminance information of each pixel point in the low-frequency image; an image splitting unit configured to split the low-frequency image according to the flat region and the non-flat region; and an image enhancement unit configured to perform image enhancement of the split non-flat region according to the second gain coefficient.

Correspondingly, the second processed image generation module may be configured to perform image fusion of the flat region, the enhanced non-flat region, and the enhanced high-frequency image to obtain a second processed image.

Based on the above embodiments, the chrominance-luminance separation color mode may include a YUV color mode and a LAB color mode.

Based on the above embodiments, the device may further include a YUV color mode image generation module configured to convert, based on an original signal acquired by an image sensor, the original signal into an image in RGB color mode, and to generate an image in YUV color mode according to the image in RGB color mode.

An embodiment of the present disclosure may further provide a storage medium including computer-executable instructions. The computer-executable instructions, when executed by a computer processor, may be configured to execute an image processing method. The method may include: acquiring an image in a chrominance-luminance separation color mode; performing scene recognition of the image to determine a scene of the image; traversing luminance components of respective pixel points in the image, and generating a luminance distribution of the image according to a traversing result of the luminance components; generating a luminance mapping relation based on a standard luminance distribution corresponding to the scene of the image and the luminance distribution of the image; and adjusting the luminance components of the respective pixel points in the image according to the luminance mapping relation to generate a first processed image.

In other embodiments, the computer-executable instructions, when executed by a computer processor, may be configured to execute an image processing method. The method may include: acquiring an image in a chrominance-luminance separation color mode; performing scene recognition of the image to determine a scene of the image; traversing luminance components of respective pixel points in the image, and generating a luminance distribution of the image according to a traversing result of the luminance components; comparing a pixel point ratio of each luminance component in the luminance distribution of the image with a pixel ratio of a corresponding luminance component in a standard luminance distribution; generating a luminance mapping relation based on a standard luminance distribution corresponding to the scene of the image and the luminance distribution of the image; and when pixel point ratio of one luminance component in the luminance distribution of the image is less than a pixel point ratio of a corresponding luminance component in the standard luminance distribution, mapping at least one of subsequent luminance components into the one luminance component until the pixel point ratio of the one luminance component in the luminance distribution of the image equals to the pixel point ratio of the corresponding luminance component in the standard luminance distribution.

Storage medium may refer to any of various types of memory devices or storage devices. The term "storage medium" may be intended to include: a mounting medium, such as CD-ROM, a floppy disk or a tape device; a computer system memory or a random access memory, such as DRAM, DDRRAM, SRAM, EDORAM, Rambus RAM, etc.; a non-volatile memory, such as flash memory, magnetic medium (such as hard disk or optical storage); register or other similar type of memory elements, etc. The storage medium may also include other types of memory or a combination thereof. Additionally, the storage medium may be located in a first computer system in which the program is executed, or may be located in a different second computer system which is connected to the first computer system via a network, for example, the Internet. The second computer system can provide program instructions for being executed by the first computer. The term "storage medium" can include two or more storage media that can reside in different locations (e.g., in different computer systems connected through a network). The storage medium may store program instructions (e.g., embodied as computer program) executed by one or more processors.

Of course, computer-executable instructions of the storage medium containing computer-executable instructions provided by the embodiment of the present disclosure may be not limited to the image processing operations as described above, and may also include relevant operations for implementing the image processing method provided any embodiment of the present disclosure.

Figure 8:
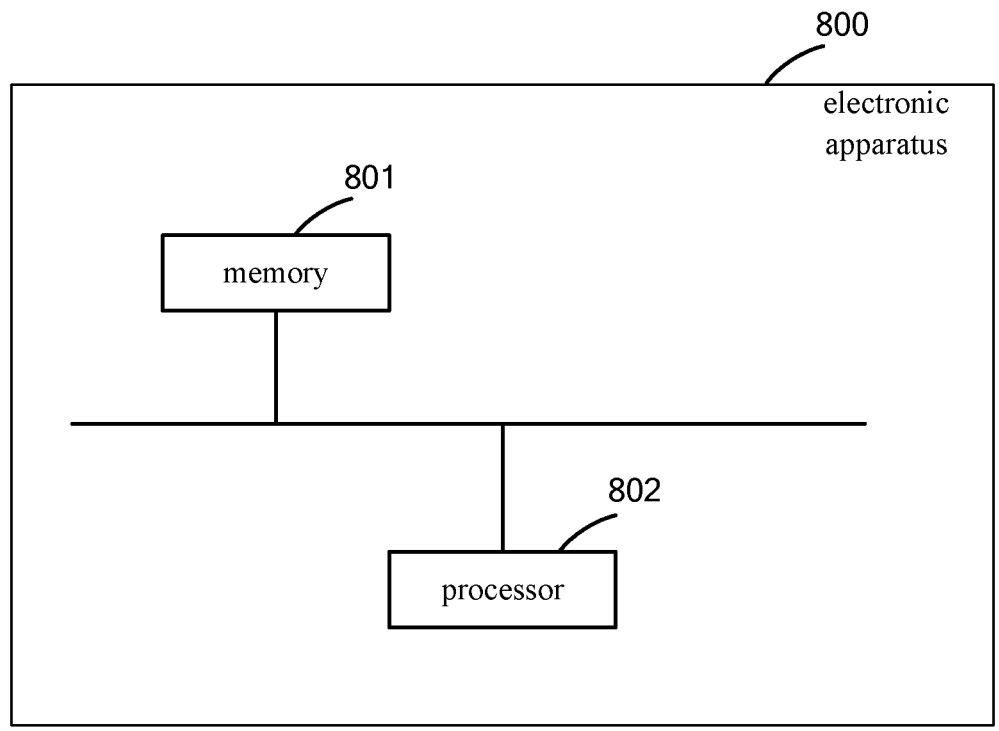
FIG. 8 is a structural diagram of an electronic apparatus according to an embodiment of the present disclosure.

An embodiment of the present disclosure may provide an electronic apparatus into which the image processing device provided by an embodiment of the present disclosure can be integrated. FIG. 8 is a structural diagram of an electronic apparatus according to an embodiment of the present disclosure. The electronic apparatus 800 may include a memory 801, a processor 802, and a computer program stored on the memory 801 and operable by the processor 802. The processor 802, when executing the computer program, implements the image processing method as described in embodiment of the present disclosure. For example, the method may include: acquiring an image in a chrominance-luminance separation color mode; performing scene recognition of the image to determine a scene of the image; performing scene recognition of the image to determine a scene of the image; generating a luminance mapping relation based on a standard luminance distribution corresponding to the scene of the image and the luminance distribution of the image; and adjusting the luminance components of the respective pixel points in the image according to the luminance mapping relation to generate a first processed image, such that luminance distribution of the image is the same as the standard luminance distribution.

The electronic apparatus provided by the embodiment of the present disclosure can achieve an optimal effect for images of different scenes, thereby improving applicability of the image processing manner. Since the apparatus processes independent luminance components, without involving any adjustment of the color components, it is guaranteed that the image color remains as it is in the above image processing process, without affecting or changing the color in the processing process, and the guaranteed image color is clear without distortion.

Figure 9:
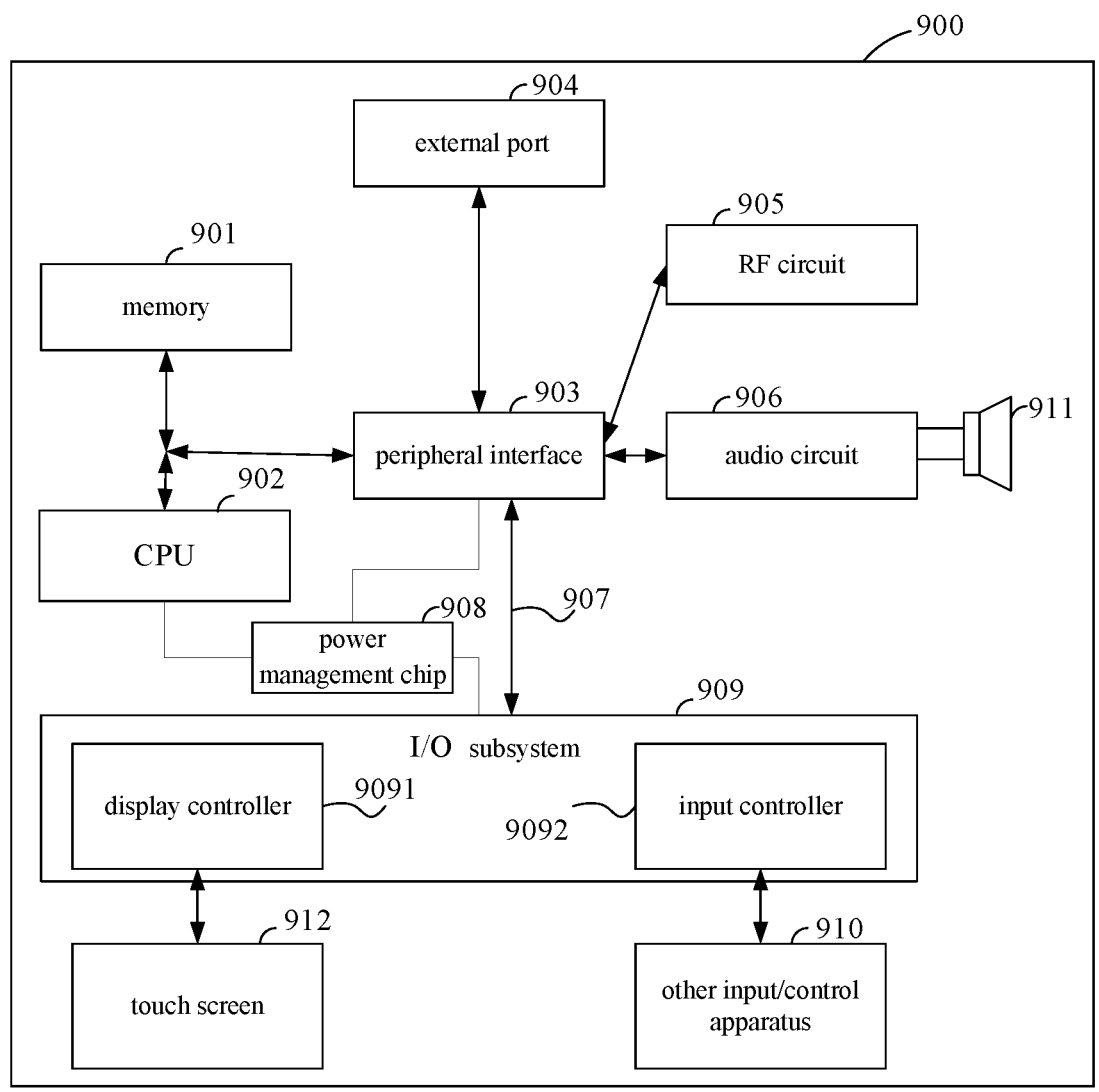
FIG. 9 is a structural diagram of another electronic apparatus according to an embodiment of the present disclosure.

FIG. 9 is a structural diagram of another electronic apparatus according to an embodiment of the present disclosure. The electronic apparatus may include: a housing (not shown), a memory 901, a central processing unit (CPU) 902 (also referred to as a processor, hereinafter referred to as CPU), a circuit board (not shown) and a power circuit (not shown). The circuit board may be disposed inside space enclosed by the housing; the CPU 902 and the memory 901 may be disposed on the circuit board; the power circuit may be configured to supply power to each circuit or means of the electronic apparatus; the memory 901 may be configured to store executable program codes; and the CPU 902 may run a computer program corresponding to the executable program codes by reading the executable program codes stored in the memory 901 to implement the following actions: acquiring an image in chrominance-luminance separation color mode; performing scene recognition of the image to determine a scene of the image; traversing luminance components of respective pixel points in the image, and generating luminance distribution of the image according to a traversing result of the luminance components; generating a luminance mapping relation based on standard luminance distribution corresponding to the scene of the image and the luminance distribution of the image; and adjusting the luminance components of the respective pixel points in the image according to the luminance mapping relation to generate a first processed image.

The electronic apparatus may further include: a peripheral interface 903, an RF (Radio Frequency) circuit 905, an audio circuit 906, a speaker 911, a power management chip 908, an input/output (I/O) subsystem 909, other input/control apparatus 910, a touch screen 912, other input/control apparatus 910, and an external port 904. These components may communicate via one or more communication buses or signal lines 907.

It should be understood that, the electronic apparatus 900 shown in the figure is merely an example of the electronic apparatus, and the electronic apparatus 900 may have components more or fewer than those shown in the figure. Two or more components may be combined, or different component configurations may be involved. The various components shown in the figure can be implemented in hardware including one or more signal processing and/or dedicated integrated circuits, software, or a combination of hardware and software.

The electronic apparatus for image processing operation provided by the present embodiment is described in detail below. The electronic apparatus takes a mobile phone as an example.

The memory 901 can be accessed by the CPU 902, the peripheral interface 903, etc. The memory 901 can include a high-speed random access memory, and can also include a non-volatile memory, such as one or more magnetic disk storage means, flash memory means, or other volatile solid-state storage means.

The peripheral interface 903 may connect input and output peripherals of the apparatus to the CPU 902 and the memory 901.

The I/O subsystem 909 can connect the input and output peripherals of the apparatus, such as the touch screen 912 and other input/control apparatus 910, to the peripheral interface 903. The I/O subsystem 909 may include a display controller 9091 and one or more input controllers 9092 for controlling the other input/control apparatus 910. Therein, the one or more input controllers 9092 receive electrical signals from other input/control apparatus 910 or transmit electrical signals to the other input/control apparatus 910. The other input/control apparatus 910 may include physical buttons (press buttons, rocker arm buttons, etc.), dial, slide switch, joystick, click wheel. It is worth noting that, the input controller 9092 can be connected to any of the following: a keyboard, an infrared port, a USB interface, and a pointing device, for example, a mouse.

The touch screen 912, which is an input interface and an output interface between the user's electronic apparatus and the user, may display visual output to the user. The visual output may include graphics, texts, icons, videos, and the like.

The display controller 9091 in the I/O subsystem 909 may receive electrical signals from the touch screen 912 or transmit electrical signals to the touch screen 912. The touch screen 912 may detect contact on the touch screen, and the display controller 9091 may convert the detected contact into interaction with a user interface object displayed on the touch screen 912, that is, realizes human-computer interaction. The user interface object displayed on the touch screen 912 may be an icon for running a game, an icon networked to a corresponding network, and the like. It is worth noting that, the apparatus may also include a light mouse, which is a touch sensitive surface that does not display visual output, or an extension of the touch sensitive surface formed by the touch screen.

The RF circuit 905 may be configured mainly to establish communication between the mobile phone and the wireless network (i.e., the network side) to realize data reception and transmission of the mobile phone and the wireless network, for example, receiving and sending instant messages, emails, and the like. Specifically, the RF circuit 905 may receive and transmit an RF signal, which is also referred to as an electromagnetic signal. The RF circuit 905 may convert the electrical signal into an electromagnetic signal or convert an electromagnetic signal into an electrical signal, and communicate with communication network and other devices through the electromagnetic signal. The RF circuit 905 may include known circuit for performing these functions, including, but not limited to, an antenna system, an RF transceiver, one or more amplifiers, a tuner, one or more oscillators, a digital signal processor, a CODEC (Coder-Decoder) Chipset, Subscriber Identity Module (SIM), etc.

The audio circuit 906 may be configured mainly to receive audio data from the peripheral interface 903, to convert the audio data into an electrical signal, and to send the electrical signal to the speaker 911.

The speaker 911 may be configured to restore a voice signal received by the mobile phone from the wireless network through the RF circuit 905 to sound and to play the sound to the user.

The power management chip 908 may be configured to perform powering and power management of hardware connected to the CPU 902, I/O subsystem, and peripheral interfaces.

The image processing device, the storage medium, and the electronic apparatus provided by the foregoing embodiments may perform an image processing method provided by any embodiment of the present disclosure, and have corresponding functional modules for executing the method and beneficial effects. For technical details that are not described in detail in the above embodiments, reference may be made to the image processing method provided by any embodiment of the present disclosure.

It is noted that the above are only preferred embodiments of the present disclosure and technical principles applied. Persons skilled in the art will understand that, the present disclosure is not limited to specific embodiments described herein, and various obvious changes, modifications and substitutions can be made by those skilled in the art without departing from the scope of the present disclosure. Therefore, although the present disclosure has been described in detail through the above embodiments, the present disclosure is not only limited to the above embodiments, and may also include other functionally equivalent embodiments without departing from the concept of the present disclosure. The scope of the present disclosure is determined by the scope of the appended claims.

What is claimed is:

1. A method for image processing, comprising:
   traversing luminance components of respective pixel points in an image, and generating a luminance distribution of the image according to a traversing result of the luminance components;
   generating a luminance mapping relation based on a standard luminance distribution corresponding to a scene of the image and the luminance distribution of the image;
   adjusting the luminance components of the respective pixel points in the image according to the luminance mapping relation to generate a first processed image; and
   after generating the first processed image:
   performing edge recognition of the first processed image;
   determining a filtering kernel that performs a filtering processing of the image according to an edge recognition result;
   performing a filtering processing of the first processed image based on the filtering kernel to obtain a low-frequency image corresponding to the first processed image and a high-frequency image corresponding to the first processed image; and
   determining a first gain coefficient of the high-frequency image, performing an enhancement processing of the high-frequency image according to the first gain coefficient, and performing an image fusion of the low-frequency image and an enhanced high-frequency image to obtain a second processed image.

2. The method according to claim 1, further comprising:
   determining a second gain coefficient of the low-frequency image, and performing an enhancement processing of the low-frequency image according to the second gain coefficient;
   wherein performing image fusion of the low-frequency image and the enhanced high-frequency image to obtain the second processed image comprises:
   performing image fusion of an enhanced low-frequency image and the enhanced high-frequency image to obtain a second processed image.

3. The method according to claim 2, wherein determining the first gain coefficient of the high-frequency image and determining the second gain coefficient of the low-frequency image comprises:
   determining the first gain coefficient of the high-frequency image according to gain values of all the pixel points in the high-frequency image, and determining the second gain coefficient of the low-frequency image according to gain values of all the pixel points in the low-frequency image;
   wherein a gain value of each of the pixel point is determined by:
   calculating, based on a window of a preset size, a local variance of a window region with a pixel point as a center for the high-frequency image and the low-frequency image respectively; and
   determining the gain value of the pixel point according to a local standard deviation corresponding to the local variance of the window region.

4. The method according to claim 3, wherein performing the enhancement processing of the low-frequency image according to the second gain coefficient comprises:
   identifying a flat region and a non-flat region in the low-frequency image according to luminance information of each pixel point in the low-frequency image;
   splitting the low-frequency image according to the flat region and the non-flat region; and
   performing image enhancement of the split non-flat region according to the second gain coefficient;

wherein performing image fusion of the enhanced low-frequency image and the enhanced high-frequency image to obtain the second processed image comprises:
performing image fusion of the flat region, the enhanced non-flat region, and the enhanced high-frequency image to obtain a second processed image.

5. The method according to claim 4, wherein the image in YUV color mode is generated by:
converting, an original signal acquired by an image sensor into an image in RGB color mode; and
generating an image in YUV color mode according to the image in RGB color mode.

* * * * *